(12) United States Patent
Berthold et al.

(10) Patent No.: US 11,404,947 B2
(45) Date of Patent: Aug. 2, 2022

(54) DEVICE FOR THE TRICKLE IMPREGNATION OF A STATOR OR ARMATURE OF AN ELECTRIC MACHINE

(71) Applicant: copperING GmbH, Wernigerode (DE)

(72) Inventors: Jens Berthold, Hoym (DE); Stefan Schneider, Halberstadt (DE); Richard A. Rasp, Usingen (DE)

(73) Assignee: GEHRING E-TECH GMBH, Ostfildern (DE)

( * ) Notice: Subject to any disclaimer, the term of this patent is extended or adjusted under 35 U.S.C. 154(b) by 588 days.

(21) Appl. No.: 16/489,410

(22) PCT Filed: Feb. 18, 2018

(86) PCT No.: PCT/DE2018/000034
§ 371 (c)(1),
(2) Date: Nov. 5, 2019

(87) PCT Pub. No.: WO2018/157877
PCT Pub. Date: Sep. 7, 2018

(65) Prior Publication Data
US 2020/0059142 A1 Feb. 20, 2020

(30) Foreign Application Priority Data
Feb. 28, 2017 (DE) .................. 10 2017 001 939.8

(51) Int. Cl.
*H02K 15/12* (2006.01)
(52) U.S. Cl.
CPC .................. *H02K 15/12* (2013.01)
(58) Field of Classification Search
CPC .................. H02K 15/12; H02K 15/125
See application file for complete search history.

(56) References Cited

U.S. PATENT DOCUMENTS

| 3,456,615 A | 7/1969 | Heinz-Jurgen et al. |
| 5,685,910 A * | 11/1997 | Thigpen .............. H02K 15/12 |
| | | 118/712 |

(Continued)

FOREIGN PATENT DOCUMENTS

| CA | 803967 A | 1/1969 |
| CN | 101627526 A | 1/2010 |

(Continued)

OTHER PUBLICATIONS

International Search Report and Written Opinion issued in corresponding PCT/DE2018/000034 dated Jun. 11, 2018, 10 pages.

(Continued)

*Primary Examiner* — Thomas Truong
(74) *Attorney, Agent, or Firm* — Carter, DeLuca & Farrell LLP

(57) ABSTRACT

The invention relates to an impregnation device (1) for trickle impregnation of a stator (2) or armature of an electric machine with a synthetic resin (5) curing under temperature increase, comprising a holding device (32) which can be tilted vertically relative to the horizontal (16) and to which a drive motor (12) is attached as a rotary drive for the stator (2) or the armature, a drive shaft (58) operatively connected to the drive motor (12), a clamping device (34) which is non-rotatably connected to the drive shaft (58) and capable of detachably connecting the stator (2) or the armature to the drive shaft (58), a trickle device (24) capable of applying a synthetic resin (5) onto at least one axial end of the windings (4) of the stator (2) or the armature, and a heating device capable of heating the windings (4) of the stator (2) or the armature to a trickle temperature and to a comparatively higher curing temperature. The heating device according to the invention comprises an electromagnetic inductor (6) which is arranged coaxially or axially parallel to the stator (2) or the armature. The invention also relates to a produc- (Continued)

Figure 2:
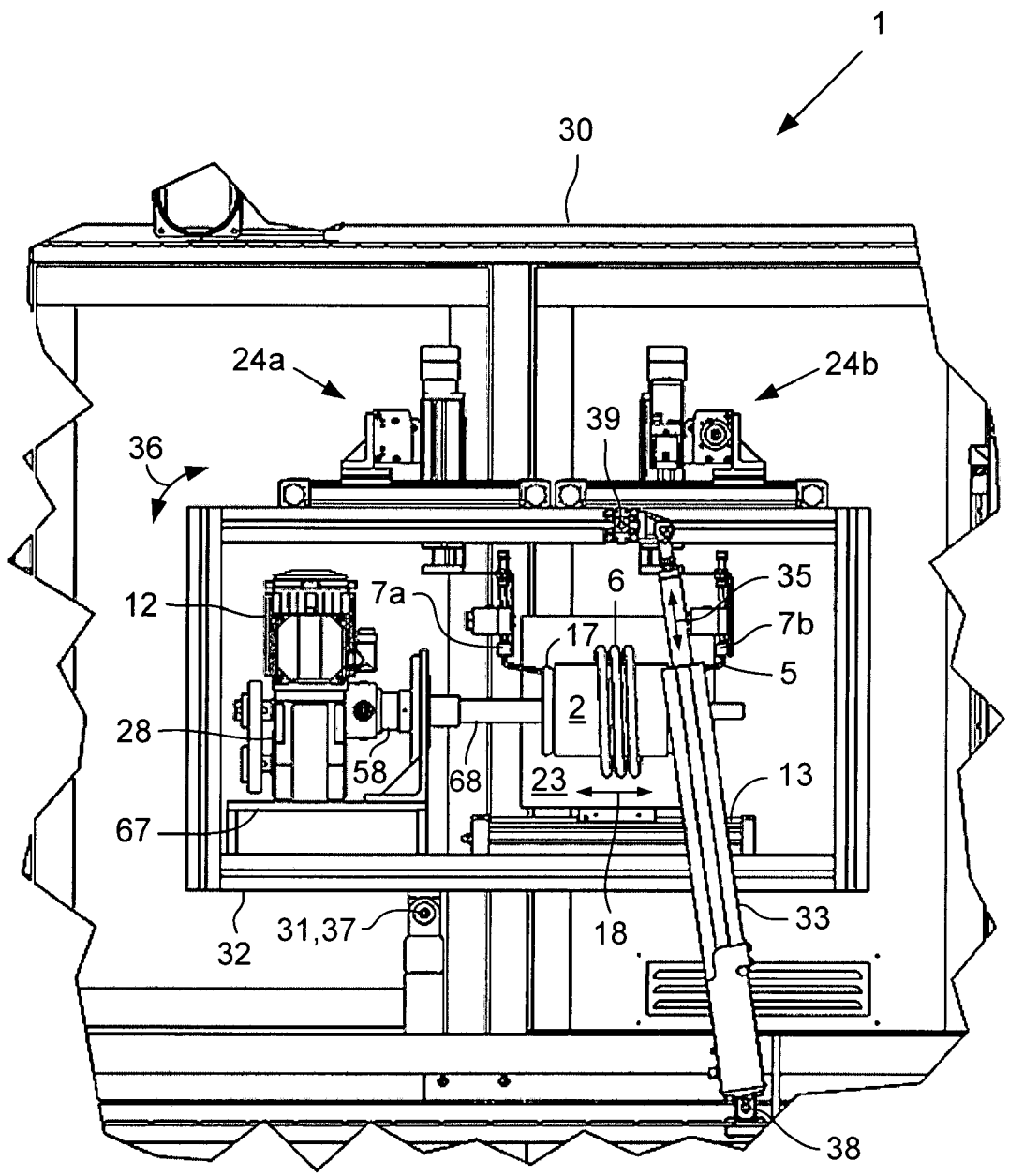

tion plant (40) for the trickle impregnation of a stator (2) or armature, in which this impregnation device (1) is integrated.

19 Claims, 3 Drawing Sheets

(56) References Cited

U.S. PATENT DOCUMENTS

| | | | |
|---|---|---|---|
| 6,302,961 | B1 | 10/2001 | Robie et al. |
| 2010/0320194 | A1 | 12/2010 | Koide et al. |
| 2016/0254734 | A1* | 9/2016 | Kimura ............ H02K 15/12 29/596 |

FOREIGN PATENT DOCUMENTS

| | | |
|---|---|---|
| CN | 105359394 A | 2/2016 |
| DE | 01212204 B | 3/1966 |
| DE | 1538918 A1 | 11/1970 |
| DE | 1919642 A1 | 11/1970 |
| DE | 4334959 A1 | 4/1994 |
| DE | 102009045200 A1 | 4/2011 |
| DE | 112014002790 T5 | 3/2016 |
| EP | 0817358 A1 | 1/1998 |
| EP | 2110932 A1 | 10/2009 |
| JP | 2005086954 A | 3/2005 |
| JP | 2010262828 A | 11/2010 |
| JP | 2012005283 A | 1/2012 |

OTHER PUBLICATIONS

German Examination Report issued in German Application No. 10 2017 001 939.8 dated Feb. 8, 2019, 6 pages.
English Trasnlation of Chinese Office Action for Application No. 201880027282.0 dated Dec. 11, 2020.

* cited by examiner

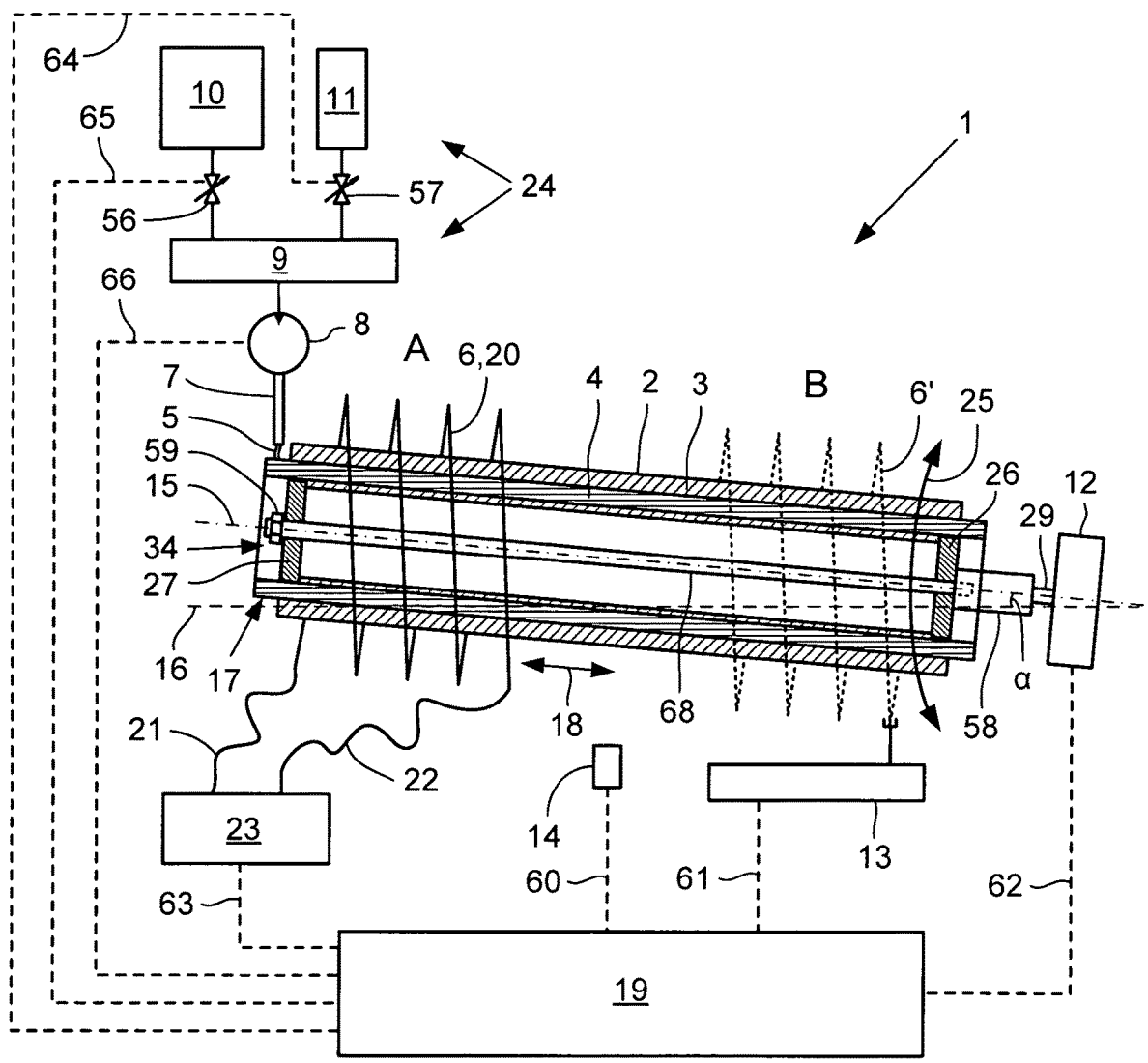
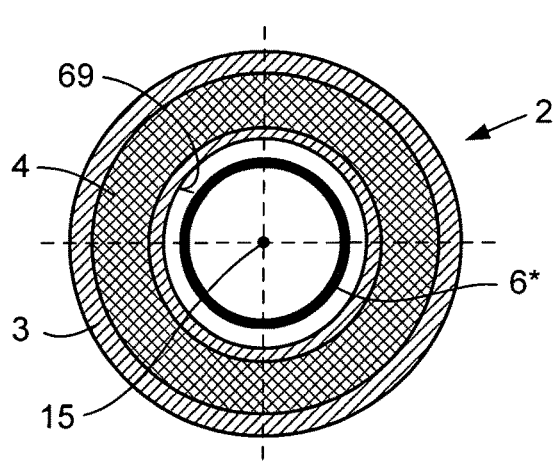
Fig. 1
Fig. 3

DEVICE FOR THE TRICKLE IMPREGNATION OF A STATOR OR ARMATURE OF AN ELECTRIC MACHINE

The invention relates to an impregnation device for impregnating a stator or armature of an electric machine with a synthetic resin which cures under temperature increase, comprising a holding device which can be tilted vertically with respect to the horizontal and to which a drive motor is attached as a rotary drive for the stator or armature, a drive shaft operatively connected to the drive motor, a clamping device which is non-rotatably connected to the drive shaft and capable of detachably connecting the stator or armature to the drive shaft, a trickle device capable of applying a synthetic resin onto at least one axial end of the windings of the stator or armature, and a heating device capable of heating the windings of the stator or armature to a trickle temperature and to a comparatively higher curing temperature. In addition, the invention relates to a production plant for the trickle impregnation of a stator or armature, in which this impregnation device is integrated.

It is well known that during the manufacture of an electric machine, be it an electric motor or a generator, a stabilization of the windings of the stator and armature must be carried out. Today, this is usually done by means of a so-called trickle process and a corresponding impregnation device. To this purpose, the stator or armature is heated and usually clamped in the impregnation device with its longitudinal axis inclined, and is rotated about this longitudinal axis. However, the stator or armature can also be aligned horizontally. Then, a synthetic resin which is initially liquid at room temperature is trickled preferably on the higher positioned axial end of the stator or armature, for example on its winding head. The resin may comprise one or more components, for example a base resin and a hardener.

The volume flow rate with which the still liquid synthetic resin is applied to the stator or armature is adapted to the respective absorbing capacity of the same. After trickling on, the synthetic resin enters the interstices between the winding wires as well as the sheet stacks and fills these interstices completely. When the stator or armature is subsequently heated to a curing temperature of the synthetic resin, it solidifies and becomes a duroplast which, after this curing, cannot be deformed by re-heating. As a result, the components of the stator or armature that came into contact with the synthetic resin are fixedly connected to each other. The duroplast meets all the mechanical and electrical requirements made on a stationary or rotating electric machine.

In order to ensure optimum penetration of the initially liquid synthetic resin into the stator or armature, at least the stator or armature is heated to a so-called trickle temperature before the trickle process begins and is maintained at this temperature during the trickle process. The trickle temperature can be between 70° C. and 90° C. depending on the synthetic resin used. After a predetermined amount of the initially liquid synthetic resin has been introduced into the stator or armature, the latter is heated to a curing temperature, which is between 120° C. and 160° C., for example, also depending on the synthetic resin. This curing temperature is then maintained for a predetermined period of time to allow complete curing of the synthetic resin. Finally, the stator or armature is cooled down to room temperature and provided for further manufacturing processes to produce the electric machine.

The heating of the stator or armature to the trickle temperature and the curing temperature can be performed in a suitable furnace. However, it is already known from DE 1 212 204 A and DE 19 19 642 A to achieve the heating of the stator or armature by means of an electrical heating current which is passed through the windings of the stator or armature. Since simply passing a heating current through the windings causes excessive deviations of the attainable actual temperatures from the desired set-point temperatures, it was suggested to ensure obtaining and maintaining the desired temperatures by regulating the heating current. Here the finding was used that in a winding the ohmic resistance increases with increasing temperature, so that the temperature of the winding can be inferred from the ohmic resistance. In DE 1 212 204 A it was therefore proposed that when the electric resistance value of the winding required for the presence of the trickle temperature or the curing temperature is reached, the heating current passed through the winding of the stator or armature is switched off. The heating current is switched on again only when a predetermined lower resistance value of the winding is measured, which is equivalent to falling below a lower limit temperature.

A disadvantage of these known processes and the devices used to impregnate a stator or armature of an electric machine is, however, that the temperature is controlled by means of a heating current passed through the winding, which must be fed into the rotating stator or armature in a technically complex manner. Moreover, the methods and devices proposed in the two publications have the deficiency that the regulation of the heating current is based solely on the temperature of the winding through which the heating current flows. This is unfavorable at least in those periods of time in which the other components surrounding the windings have not yet reached the temperature of the windings. Since the synthetic resin comes into contact not only between adjacent wires or wire portions of the windings, but also with other components of the stator or armature, the resulting temperature of the synthetic resin present there is not exactly known. Therefore, at least the heating phase until the trickle temperature is reached should be extended on the basis of experience until it can be assumed that the winding temperature determined by the electric resistance measurement is also present at all other components of the stator or armature. Only then the trickling of the synthetic resin into the stator or armature can be started with the desired process reliability. Since this uncertainty with respect to the temperatures of the stator or armature components and the synthetic resin is also present at the beginning of the curing process, the latter must also be disadvantageously extended by a safety period. Ultimately, it is considered adverse that the heating of the synthetic resin takes place only indirectly by heat transfer from the windings. As a result, reaching the trickle temperature and the curing temperature requires a comparatively long time.

The described time periods for impregnating a stator or armature result in an expensive extension of the production time as well as an increase of the energy costs for heating up and keeping the trickle and curing temperatures constant.

It is therefore an object of the invention to provide a device with which the impregnation of a stator or armature of an electric machine with a synthetic resin curing under the effect of heat can be carried out faster and with higher energy efficiency and higher cost efficiency than before. In addition, a fully automatic production plant is to be presented in which the aforementioned device is integrated.

This object is achieved by an impregnation device having the features of claim 1. Independent claim 15 specifies an autonomously operating production plant in which an impregnation device for impregnating a stator or armature of an electric machine having the features of the invention is optimally integrated in terms of process technology. Advantageous developments of the impregnation device and the production plant are defined in the corresponding dependent claims.

The invention therefore relates to an impregnation device for impregnating a stator or armature of an electric machine with a synthetic resin curing under temperature increase, comprising a holding device which can be tilted vertically with respect to the horizontal and to which a drive motor is attached as a rotary drive for the stator or armature, a drive shaft operatively connected to the drive motor, a clamping device which is non-rotatably connected to the drive shaft and capable of detachably connecting the stator or armature to the drive shaft, a trickle device capable of applying a synthetic resin onto an axial end of the windings of the stator or armature, and a heating device capable of heating the windings of the stator or armature to a trickle temperature and to a comparatively higher curing temperature. According to the invention, the heating device comprises an electromagnetic inductor which is arranged coaxially or axially parallel to the stator or armature.

The invention is based on the finding that a stator or armature for an electric machine can be brought very advantageously to the trickle temperature and the curing temperature and can be maintained at these temperatures by means of inductive heating. It is of particular importance that in all electrically conductive components of such a stator or armature, eddy currents which simultaneously heat these components are simultaneously generated by only one inductor. This significantly reduces the heating time and the electrical energy required in comparison to conventional impregnation methods. As a result, the manufacturing costs for the impregnation are reduced.

With an impregnation device having the features of the invention, the heating of all electrically conductive components of the stator or armature is carried out by means of electrical eddy currents which are generated by a high-frequency or medium-frequency alternating magnetic field of an electromagnetic inductor which embraces the stator or armature radially on the outside in a hollow cylindrical or helical coaxial manner. However, the electromagnetic inductor can also be arranged in a central, coaxial cavity of the stator. The electrical eddy currents simultaneously heat all electrically conductive components of the stator or armature, i.e. the iron sheet stack frames, the sheets of the sheet stack, the winding wires and, via heat conduction, also the trickled (introduced) synthetic resin. In this way, other components or objects (such as insulation material) which are in contact with the electrically conductive components of the stator or armature are also indirectly brought to the desired trickle temperature or curing temperature.

The claimed device can be designed such that the inductor is arranged coaxially or axially parallel to the stator or armature only over a portion of the axial length or over the entire axial length of the stator or armature. In addition, it may be provided that the inductor is arranged radially above the stator or armature, or that the inductor is arranged radially inside the stator, as mentioned above.

If the inductor is of the same or similar length as the stator or armature, the power regulation of the inductor, and thus, the intensity of the eddy currents induced in the stator or armature can be regulated by switching the inductor on and off in a clocked manner. If the inductor is axially shorter than the stator or armature, the inductor can be moved coaxially back and forth along the length of the stator or armature. As a result, only certain axial portions of the stator or armature are exposed to the alternating magnetic field of the inductor, while the unexposed areas of the stator or armature merely transfer their heat to adjacent components, both axially and radially, for making the total heating more uniform. Also with this modification, the inductor can be additionally activated and deactivated in a clocked manner, in view of its electromagnetic effectiveness.

The length of the time periods during which the inductor is switched on or off essentially depends on the capability of the inductor, the electrical conductivity of the stator or armature components and their thermal capacity and thermal conductivity. When regulating the inductor, the procedure is such that the heating of the stator or armature components and of the synthetic resin contained therein is carried out in an energy-saving and comparatively fast manner.

In accordance to an advantageous development of the impregnation device, it comprises a metal frame, a holding device arranged on the frame via a first pivot bearing so as to be tiltable about a horizontal pivot axis, a pivot actuator for pivoting the holding device on the first pivot bearing with respect to the frame, a drive motor attached to the holding device, a drive shaft operatively connected to the drive motor, and a clamping device which is non-rotatably connected to the drive shaft and capable of detachably connecting the stator or armature to the drive shaft, wherein at least one component of this clamping device engages radially inwardly on the stator or radially outwardly on the armature, and an electromagnetic inductor which is arranged coaxially or axially parallel to the stator or armature and to the clamping device. This provides a compact impregnation device which can be integrated into an autonomous working production plant.

The adjustable inclination angle of the vertically tiltable holding device is, for example, 0° to 20° relative to the horizontal, including the range boundaries. This allows the resin to easily penetrate into the interior of the stator or armature following gravity.

For coupling a stator to said drive shaft, it may be provided that the clamping device, which is connected in a non-rotatable manner to the drive shaft, has at least one clamping rod which penetrates the stator axially radially inside, and that the clamping rod is connected directly or indirectly to the stator.

In order to obtain a particularly stable connection, it may be provided that the clamping rod is connected at its axial end to at least two clamping jaws or at least two radially segmented clamping discs, that these clamping jaws or clamping discs are each arranged so as to abut radially inwardly on an axial end of the stator frame, and that the two clamping jaws or clamping discs can be clamped against the stator by means of the clamping rod so that the former is fixed to the clamping rod.

By means of suitable holders on the clamping jaws or on the two segmented clamping discs and on the axial ends of the clamping bar and/or by means of respective screw nut connections, the clamping bar can clamp the clamping discs or clamping jaws against each other and can thereby fix the stator to the clamping bar. This attaches the stator to the drive shaft in an operatively and mechanically stable manner. The longitudinal axes of the drive shaft and the stator are aligned coaxially to each other. In order to mechanically relieve the drive shaft connected to the drive motor from the weight of the stator, the clamping rod can be mounted far from the drive shaft in a support bearing. It is also possible to use several clamping rods if this appears advisable due to the weight of the stator. To support an armature on the drive shaft, for example, clamping jaws of a different clamping device are used, which engage at the end of the armature shaft close to the drive motor.

It may also be provided that the inductor is electrically connected to a voltage source which operates as a frequency converter, and that this voltage source, like the inductor, is arranged on the tiltable holding device. This simplifies the power supply to the inductor, since both the inductor and its voltage source are in the same coordinate system, and accordingly both devices are also moved synchronously when the holding device is tilted. Therefore, cheaper rigid electrical cables can be used between the voltage source and the inductor.

According to another embodiment it can be provided that the inductor is connected to the actuating element of an actuator, capable of arranging the inductor on the holding device so as to be movable coaxially or axially parallel to the longitudinal axis of the stator or armature. Alternatively, it may be provided that both the inductor and its voltage source are connected to the actuating element of an actuator, capable of arranging the inductor on the holding device so as to be movable coaxially or axially parallel to the longitudinal axis of the stator or armature, and arranging the voltage source the holding device so as to be movable parallel to the longitudinal axis of the stator or armature.

The actuator can be designed as an electric actuator or as a pressure medium-driven piston-cylinder arrangement effective in both axial directions. Compressed air or a hydraulic fluid can be used as drive fluid. If both the inductor and its voltage source are moved by means of the actuator, a flexible electrical connection as described above can be avoided, since the said two devices are located in the same coordinate system, which can be tilted by means of the holding device, and in which a common axial movement can be carried out.

According to another development of the trickle impregnation device, it may be advantageously provided that the trickle device comprises a container for a synthetic resin, a container for a hardener, a mixing container for mixing the synthetic resin and the hardener, shut-off valves in the pipes between these containers, and a pump. In addition, the pump is connected to at least one trickle nozzle via a supply pipe capable of trickling the synthetic resin-hardener mixture onto the windings of the stator or armature. The pump is preferably designed as a peristaltic pump and four trickle nozzles are preferably used, of which two trickle nozzles are directed to the radially outer side and two further trickle nozzles to the radially inner side of the winding head of the stator or armature.

In addition, the device for trickle impregnation having the features of the invention preferably comprises a temperature sensor capable of contactlessly measuring the outside temperature of the stator or armature. Contactless temperature measurement is advantageous due to the rotation of the stator or armature during the trickle process and the curing process, since it is not necessary to attach stationary temperature sensors to the stator or armature and to lead out their signals from the rotating system.

In order to be able to carry out fully automatic control and regulation of the process of trickle impregnation including the curing phase, a control unit may be provided which is connected via a sensor cable to the temperature sensor and via control cables to the drive motor, the voltage source for the inductor, the actuator for generating the axial movement of the inductor and, if necessary, also the voltage source, the pump for conveying the synthetic resin-hardener mixture and the shut-off valves between the containers for the synthetic resin and the hardener and the mixing container. In addition, the control unit can be connected via further control cables to the pivoting actuator for the above mentioned tiltable holding device or its control valves.

The contactlessly working temperature sensor is thus connected to a control unit in which the measured temperature values are processed. The control unit switches the inductor on or off depending on whether the actual temperature measured on the outside of the stator or armature falls below, reaches or exceeds a predetermined set-point temperature. Additionally or alternatively, the activation and deactivation of the inductor can also be time controlled. After switching off the inductor, the stator or armature both radiates heat to the outside and transfers heat to the inside. This heats up the interior of the stator or armature and thus also all insulating components arranged there, as well as the trickled (introduced) synthetic resin or synthetic resin-hardener mixture. The process of temperature-controlled or time-controlled switching on and off of the inductor, with the waiting phase to be maintained in between, is repeated until the complete stator or armature has reached the desired trickle temperature or curing temperature. The described process is preferably also used to maintain the trickle temperature or curing temperature once reached, or a trickle temperature range or curing temperature range, respectively, over a certain period of time.

The temperature of the stator or armature is 80° C. to 130° C. in a preferred trickle temperature range, and 140° C. to 170° C. in a curing temperature range, including the respective range boundaries.

During the trickle process and the curing process, the stator or armature is rotated around its longitudinal axis at a rotational speed of 5 to 40 revolutions per minute, for example, in order to achieve uniform distribution of the synthetic resin or the synthetic resin-hardener mixture. These rotational speed specifications also include the range boundaries.

To ensure uniform heating and the maintenance of a predetermined trickle temperature or curing temperature, it may be provided that the speed control of the actuator for axial displacing the inductor is such that, over a predetermined period of time, the average dwell time of an electromagnetically active inductor in all regions of the stator or armature is approximately the same.

The invention also relates to a production plant for the trickle impregnation of a stator or armature of an electric machine with a synthetic resin curing under temperature increase. According to the invention, the plant comprises the following:

- an input module for storing non-impregnated stators or non-impregnated armatures,
- an impregnation module with an impregnation device having an electromagnetic inductor for the trickle impregnation of stators or armatures, which impregnation device comprises the features of at least one of claims 1 to 14,
- a cooling module for cooling down and storing impregnated stators or armatures,
- an output module for storing cooled and impregnated stators or armatures, and
- a first robot (automatic handling device) for transporting the respective stator or armature between the input module, the impregnation module, the cooling module and the output module,
- wherein the first automatic handling apparatus is configured such that it can hold the respective stator or armature, tilt it with respect to the horizontal, rotate it about its longitudinal axis, arrange it coaxially with a hollow cylindrical or coil-shaped inductor, and move it axially with respect to the stationary or axially movable inductor.

This production plant may additionally have a curing module in which stators or armatures that have not yet cured or have only cured initially are arranged for final, complete curing. In this case, the first robot is designed such that it can also fill and empty the curing module with stators and/or armatures.

With regard to the curing module, in order to increase the clock frequency at which the production plant can operate, it is preferably provided that it comprises at least one inductor of its own, capable of heating stators or armatures stored in the curing module for complete curing.

In addition, it may be provided that the curing module has a separate rotary drive for each stator or armature to be stored there, capable of rotating the respective stator or armature about its longitudinal axis at least at the beginning of curing.

Finally, a storage module may be provided with this production plant, in which synthetic resin containers and hardener containers can be stored. This storage module can be filled and emptied by the first robot or by a second robot.

Said modules can be designed as cabinets with loading and unloading openings. However, they can also only be production areas with the devices and/or storage shelves arranged there and protected against unauthorized access.

Figure 4:
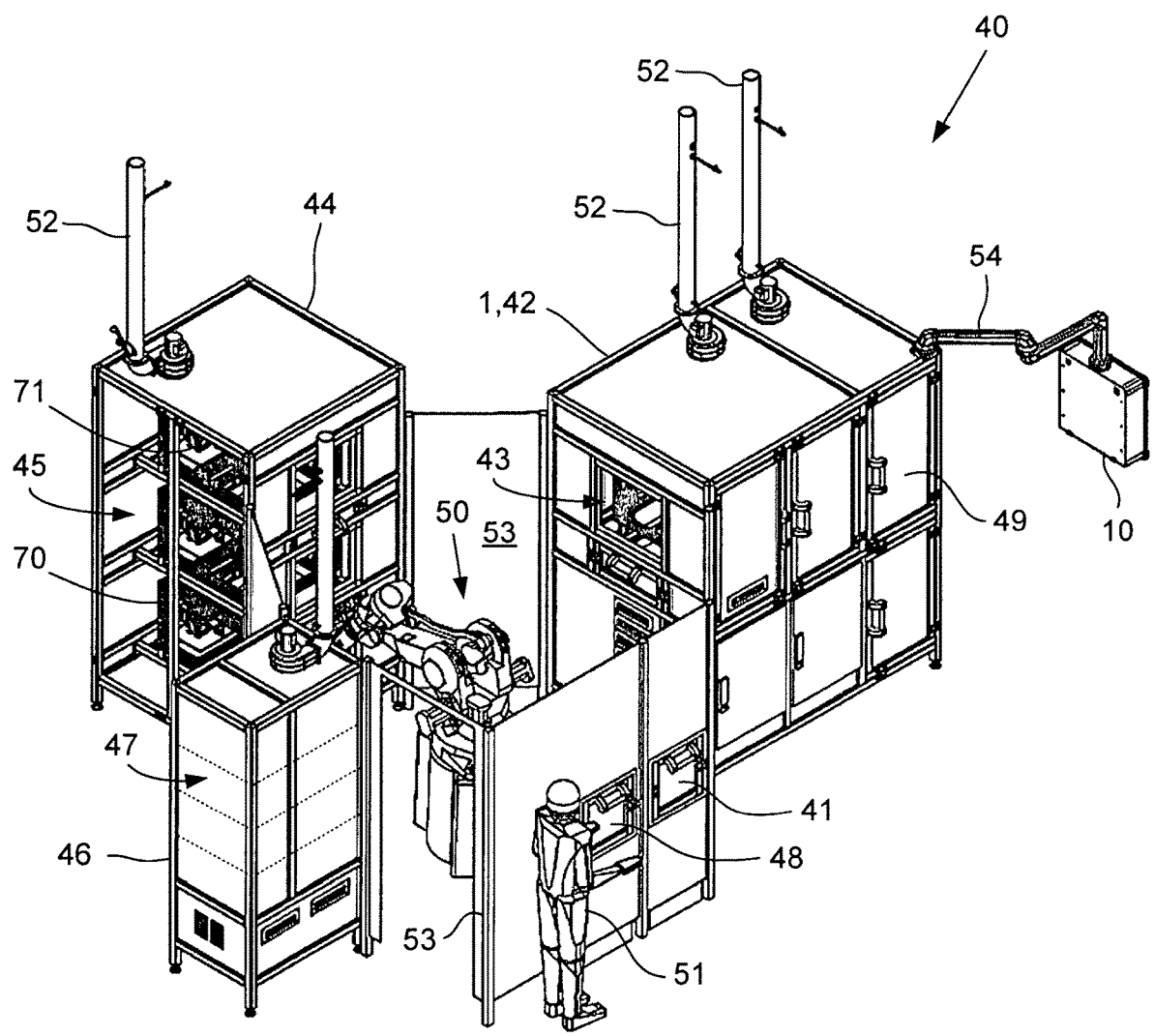

For a better understanding of the invention, a drawing is attached in which an embodiment is shown. In the drawing:

FIG. 1 is a schematic view of an impregnation device having the features of the invention, in which a stator coaxially surrounded by an electromagnetic inductor is shown in a schematic longitudinal section, FIG. 2 is a side view of essential components of the impregnation device of FIG. 1 in a structurally detailed view, FIG. 3 is a schematic cross-section through a stator, wherein an electromagnetic inductor is coaxially arranged in its the cylindrical cavity, and FIG. 4 is a perspective top view of a production plant for trickle impregnation, in which an impregnation device according to the invention is integrated.

Accordingly, FIG. 1 in total shows an impregnation device 1 for a hollow cylindrical stator 2 which is shown in a schematic longitudinal section. A stator 2 treated in impregnation device 1 is intended for installation in an electric machine after its final completion. Stator 2 has, for example, a conventional structure with stator segments arranged in a ring shape, wherein each of these stator segments has a frame 3 to which sheets arranged in series are attached. Between respectively adjacent stator segments, stator windings 4 made of wires are arranged, the cable ends of which are led out to a winding head 17 located at an axial end. Moreover, stator 2 contains insulation material which is not shown and which separates components to be electrically separated from each other.

Stator 2 is accommodated in impregnation device 1 with its longitudinal axis 15 inclined to a horizontal 16 by an inclination angle α, wherein the inclination angle can be between 0° and 20°. A respective pivoting movement 25 is indicated by a double arrow in FIG. 1

Stator 2 is rotatably mounted in impregnation device 1 and can be driven around its longitudinal axis 15 by an electric drive motor 12. For this purpose, drive motor 12 with its motor shaft 29 is connected to a clamping device 34 carrying the stator 2 via a drive shaft 58 shown not to scale. Drive motor 12 is also connected to a control unit 19 of impregnation device 1 via a control cable 62 shown dashed.

In the embodiment shown, the clamping device 34 essentially comprises a clamping rod 68 and two radially segmented clamping discs 26, 27. The two clamping discs 26, 27 each have a central bore through which the clamping rod 68 is guided coaxially. First clamping disc 26, which is close to the drive motor, is supported axially with one end face on drive shaft 58 and with its other end face on the radially inner end of frame 3 of stator 2, which is close to the drive motor. Second clamping disc 27 is supported with its end face, that is close to the drive motor, on the radially inner end of frame 3 of stator 2 which is remote from the drive motor. The clamping rod 68 is detachably coupled to the drive shaft 58 with its end that is close to the drive motor, while a screw nut 59 is screwed onto its end remote from the drive motor. Tightening screw nut 59 clamps all the aforementioned components of clamping device 34 as well as stator 2 against each other and with drive shaft 58. As a result, stator 2 is releasably fixed to drive shaft 58 by means of clamping device 34 and can be rotated together with the same about its longitudinal axis 15.

Stator 2 is coaxially surrounded by an inductor 6, which is designed as an electrical coil, over a comparatively short axial portion. Inductor 6 consists of a helically bent tube 20, through which a coolant can be led. However, inductor 6* can also be a flat structure, for example with a substantially hollow cylindrical geometry (see FIG. 3). The embodiment depicted in FIG. 1 clearly shows that the axial length of inductor 6 is shorter than the axial length of stator 2. Inductor 6 is connected via cables 21, 22 to a voltage source 23 which operates as a frequency converter and which can generate an alternating voltage of the desired frequency. For controlling the operation of voltage source 23, it is connected to control unit 19 via a control cable 63. During operation of inductor 6, an alternating current flows through it and generates an alternating magnetic field, which generates eddy currents in all electrically conductive components of stator 2, which heat these components simultaneously. Adjacent electrically insulating materials of stator 2 are also heated by heat radiation or heat conduction.

Inductor 6 is arranged coaxially slidable to stator 2 by means of an actuator 13. This actuator 13 is, for controlling the same, connected to control unit 19 via a control cable shown dashed. Using actuator 13, inductor 6 can be moved back and forth between a first axial end position A and a second axial end position B. These directions of movement 18 of inductor 6 are illustrated by a double arrow. FIG. 1 shows inductor 6' in the second end position B with a dotted line.

Since inductor 6 has a small axial length in comparison to stator 2, and is constantly moved back and forth by actuator 13 between the two axial end positions A, B, a substantially uniform heating of all components of stator 2 can be achieved. When after a heat treatment of the first axial end portion of stator 2, the inductor 6 has left this location towards the second axial end portion, the heat present at the first end portion of stator 2 can be transferred inside stator 2 to all the components there, so that even electrically non-conductive components of stator 2 are heated comparatively uniformly together with the electrically conductive components. This also avoids too fast and too strong heating of the metallic components of stator 2, for example, which would otherwise damage non-metallic components of stator 2, such as materials for electrical insulation. The same also occurs at the second axial end portion of stator 2 and in the axially interposed region of stator 2.

There is also a temperature sensor 14 which can measure the surface temperature of stator 2. The temperature measurement is performed contactless and temperature sensor 14 is connected to control unit 19 via a sensor cable 60 shown dashed.

As further shown in FIG. 1, impregnation device 1 also includes a trickle device 24, which includes a first container 10 for a synthetic resin which is liquid at room temperature and a second container 11 for a liquid hardener. Via valves 56, 57 arranged in corresponding pipes, synthetic resin and hardener are fed into a mixing container 9 in a predetermined quantity ratio. The two valves 56, 57 are connected to control unit 19 via control cables 64, 65. The synthetic resin-hardener mixture 5 is led by means of a pump 8 from the mixing container 9 to at least one trickle nozzle 7, 7a, 7b, through which the synthetic resin-hardener mixture 5 can be trickled onto the winding head 17 of the stator 2 with a comparatively low flow rate. As already mentioned, a one-component synthetic resin can also be used, which also solidifies to a duroplast when the temperature increases. In this case, second container 11, the second valve and mixing container 9 can be omitted. To control the operation of pump 8, which is preferably designed as a peristaltic pump, it is connected to the control unit 19 via a control cable 66. The flow rate is adjusted such that just that amount of synthetic resin/hardener mixture 5 is applied to winding head 17 that can be absorbed by stator 2 for filling its cavities.

FIG. 2 shows in a detail of an impregnation device 1 its most important components in an embodiment depicted in a manner appropriate to the component. Impregnation device 1 therefore has a frame 30 which supports a holding device 32 which can be pivoted or tilted vertically to the horizontal 16. Holding device 32 has a frame-shaped structure and is hinged to frame 30 via a first pivot bearing 37, which can be pivoted about a horizontally aligned pivot axis 31. The possible pivot direction 36 of holding device 32 is indicated by a double arrow.

A pivot actuator 33 is used to carry out a pivot movement which can be designed to be driven by an electric motor driven or a pressure medium. In the present embodiment, it is an actuator housing arrangement which can be driven by an electric motor and whose housing is hinged to frame 30 via a second pivot bearing 38, while its axially movable actuating element is hinged to a third pivot bearing 39 via a short lever. This third pivot bearing 39 is adjustably attached to a frame portion of holding device 32. By adjusting the position of third pivot bearing 39 on holding device 32, the maximum tilt angle or inclination angle α of holding device 32 relative to the horizontal 16, which can be achieved when the actuator is extended to the maximum from the housing of the pivot actuator 33, can be adjusted. For this purpose, the actuating element of the pivot actuator 33 is moved in a positioning direction 35 indicated by a double arrow.

A bearing block 67 is attached to frame-shaped holding device 32, which supports electric drive motor 12, which is connected via a gear 28 to drive shaft 58 already mentioned in the description of FIG. 1. This drive shaft 58 is rotatably mounted in a not denoted shaft bearing, and at its end that is remote from the gear is connected to clamping rod 68 of clamping device 34 described above in a non-rotatable but detachable manner. As described, the clamping rod 68 supports stator 2 via two clamping discs 26, 27, so that the stator 2 projects into a space, in which the inductor 6 is arranged, and can be rotated by drive motor 12 and tilted by an inclination angle α with respect to the horizontal 16 by means of pivot actuator 33 and holding device 32.

Inductor 6 with the assigned voltage source 23 is also arranged on frame-shaped holding device 32, so that they are also pivoted during a pivoting movement relative to the horizontal 16. Voltage source 23 and electrically connected inductor 6 are arranged in holding device 32 so as to be axially movable by means of actuator 13 coaxially or parallel to stator 2. However, it is also possible to provide that voltage source 23 is attached to frame 30, and only inductor 6 is connected to the actuating element of said actuator 13 via suitable connecting means, so that inductor 6 is arranged to be axially movable on its own.

Inductor 6 surrounds coaxially cylindrical stator 2, as already described in detail in connection with FIG. 1. Since in the embodiment shown in FIG. 2, inductor 6 is also axially shorter than stator 2, it is moved axially back and forth by actuator 13 during operation of impregnation device 1, so that all areas of stator 2 are alternately exposed to the alternating magnetic field of inductor 6. This results in uniform heating and maintenance of the desired trickle temperature or curing temperature of stator 2.

Trickle device 24 already described in the description of FIG. 1 is also attached to holding device 32 so that it is also pivoted relative to the horizontal 16 when holding device 32 is tilted. In the embodiment shown in FIG. 2, trickle device 24 comprises two substantially identical trickle devices 24a, 24b, which are adjustably arranged parallel to longitudinal axis 15 of stator 2 on the frame of holding device 32. Their trickle nozzles 7a, 7b are adjustably aligned towards the two axial ends of stator 2, so that trickling synthetic resin-hardener mixture 5 onto winding head 17 of stator 2 can be performed at its two axial ends. Which of the two axial ends of stator 2 is supplied with synthetic resin-hardener mixture 5 depends on, for example, whether the free end of stator 2 remote from the drive motor points downwards or upwards in relation to the horizontal 16, or in other words whether the inclination angle α is positive or negative. Trickle nozzles 7a, 7b of trickle devices 24a, 24b can also be set such that both axial ends of stator 2 are trickled with synthetic resin-hardener mixture 5. It is also possible that two of the trickle nozzles 7a, 7b are arranged at each of the axial ends of stator 2, of which one trickle nozzle is directed radially outside and the other trickle nozzle is directed radially inside towards the windings 4.

FIG. 3 shows a schematic cross-section through stator 2 according to FIG. 1, wherein in its substantially cylindrical cavity 69 a cylindrical electromagnetic inductor 6* is arranged coaxially to its longitudinal axis 15. If required, this inductor 6* can also be axially moved back and forth, and can be controlled as described with regard to its activation. The heating of all components of stator 2 is then performed as already explained.

FIG. 4 shows a three-dimensional top view of a production plant 40 for the trickle impregnation of a stator 2 or armature of an electric machine with a synthetic resin or a synthetic resin-hardener mixture 5 curing under temperature increase. This production plant 40 comprises an input module 41 for storing non-impregnated stators 2 or non-impregnated armatures, an impregnation module 42 with an impregnation device 1 which has the features of at least one of the claims 1 to 14, a cooling module 46 for the cooling down and storing impregnated stators 2 or armatures, an output module 48 for storing cooled and impregnated stators 2 or armatures, and a first robot (automatic handling device) 50 for transporting the respective stator 2 or armature between input module 41, impregnating module 42, cooling module 46 and output module 48. For this purpose, the first robot 50 is designed such that it can hold the respective stator 2 or armature in place, tilt it in relation to the horizontal 16, rotate it about its longitudinal axis 15, arrange it coaxially or axially parallel to an inductor 6, 6*, and move it axially in relation to the stationary or axially movable inductor 6, 6*.

With this design of production plant 40 or first automatic handling unit 50, respectively, the tiltable frame-shaped holding device 32, pivot actuator 33, separate drive motor 12, gear 28 and drive shaft 58 are not necessary, since their functions can be provided by the first robot 50.

Furthermore, in the embodiment shown in FIG. 4, a separate curing module 44 is provided in which largely cured stators 2 or armatures are arranged for a final, complete curing, wherein the first robot 50 can also fill and empty this curing module 44. With the arrangement of this curing module 44, the heat present in stator 2 or armature towards the end of the curing process can be used to allow stator 2 or armature remote from impregnation module 42 to cure completely, while stator 2 or the armature is already cooling down slightly. Thus, the impregnation module 42 can be reloaded earlier with a stator 2 or armature to be trickled than without this measure.

The trickled stators 2 or armatures can also be disposed in curing module 44 if resin-hardener mixture 5 has already gelled after the end of the trickle process and a subsequent temperature increase of stator 2 or the armature. In this case, curing module 44 is equipped with receiving devices for stators 2 and/or armatures, on which the first robot 50 can plug them, so that the actual curing takes place in this curing module 44. For this purpose, curing module 44 comprises at least one inductor 70 for heating stators 2 or armatures to the curing temperature, and a separate rotary drive 71 for each stator 2 or armature to be stored there. This would allow a stator 2 or armature to be trickled to be stored into the impregnation module 42 even earlier than without this measure, so that the output rate of finished stators or armatures per time unit could be further increased.

Production plant 40 shown in FIG. 4 also comprises a storage module 49 in which synthetic resin containers 10 and hardener containers 11 can be stored, which can be inserted into and removed from storage module 49 by a second robot 54. In addition, it can be seen that modules 42, 44, 46, 49 of production plant 40, which are thermally stressed or contaminated with foreign material, comprise exhaust air ducts 52.

As shown, modules 41, 42, 44, 46, 48, 49 of production plant 40 are advantageously designed as cabinets or cabins. Using impregnation module 42 as an example, these have inlet openings 43 for filling and emptying the respective module. It can also be seen that curing module 44 and cooling module 46 have racks 45, 47 in which stators 2 or armatures can be stored temporarily. Barrier walls 53 are arranged to form production plant 40 as an encapsulated production island, which at least make unauthorized access for persons 51 more difficult.

The presented impregnation device 1 for trickle impregnation of a stator 2 or armature of an electric machine is characterised by its simple controllability and fast and homogeneous heating of stator 2 or the armature. In comparison to known impregnation devices, it enables all components of stator 2 or armature to be heated substantially simultaneously without the risk that, for example, thermally less stable components such as insulation materials are burning due to overheating, or at least being impaired in their intended properties. In addition, the induction heating of stator 2 or armature is much more energy efficient due to its higher thermal efficiency than heating the same in a heating furnace or by means of an electric heating current passing through the winding of stator 2 or armature, because in the latter case only the winding wires are used to heat stator 2 or armature, whereas in the induction heating of stator 2 or armature all electrically conductive components are heated simultaneously. Finally, when using the impregnation device 1 in accordance with the invention, none of the winding wires needs to be connected to an electrical voltage source and to be supplied with a heating current, so that the mounting process in the impregnation device 1 is significantly reduced in comparison to the known heating current device described at the beginning. All in all, the mentioned advantages result in a significant reduction of production time, and thus, of manufacturing costs.

The presented production plant 40 also enables fully automatic impregnation of a stator 2 or armature. If the first robot 50 has a drivable drive shaft on its handling arm and a clamping device 34 connected to this drive shaft for holding a stator 2 or armature, gripping and clamping of stator 2 or armature, as well as releasing the completely impregnated stator 2 or armature from the handling arm can be performed fully automatically.

LIST OF REFERENCE SIGNS

1 impregnation device
2 stator
3 frame of the stator
4 windings of the stator, stator windings
5 synthetic resin, synthetic resin-hardener-mixture
6 inductor (in first axial end position)
6' inductor (in second axial end position)
6* hollow cylindrical inductor (located in the stator cavity)
7 trickle nozzle
7a first trickle nozzle
7b second trickle nozzle
8 pump
9 mixing container
10 container for synthetic resin
11 container for hardener
12 drive motor
13 actuator for axial displacement
14 temperature sensor
15 longitudinal axis of the stator
16 horizontal
17 winding head of the stator
18 movement direction of the inductor
19 control unit
20 tube
21 first power cable
22 second power cable
23 voltage source; frequency converter
24 trickle device
24a first trickle device
24b second trickle device
25 pivot movement of the stator
26 first radially segmented clamping disc
27 second radially segmented clamping disc
28 gear
29 motor shaft
30 frame
31 horizontal pivot axis of the holding device
32 holding device
33 pivot actuator, actuator-housing arrangement
34 clamping device
35 positioning direction of the pivot device
36 pivot direction of the holding device
37 first pivot bearing
38 second pivot bearing 39 third pivot bearing
40 production plant for trickle impregnation
41 input module
42 impregnation module
43 inlet opening of the impregnation module
44 curing module
45 rack in curing module
46 cooling module
47 rack in cooling module
48 output module
49 storage module
50 first robot
51 person
52 exhaust air ducts
53 barrier
54 second robot
56 first valve
57 second valve
58 drive shaft
59 screw nut
60 sensor cable
61 first control cable
62 second control cable
63 third control cable
64 fourth control cable
65 fifth control cable
66 sixth control cable
67 bearing block
68 clamping rod
69 cavity of the stator
70 inductor in curing module
71 rotary drive in curing module
A first axial position
B second axial position
α inclination angle

The invention claimed is:

1. An impregnation device for trickle impregnation of a stator or armature of an electric machine with a synthetic resin curing under temperature increase, comprising:
   a holding device which can be tilted vertically with respect to the horizontal, and to which a drive motor is attached as a rotary drive for the stator or the armature;
   a drive shaft operatively connected to the drive motor;
   a clamping device which is non-rotatably connected to the drive shaft and capable of detachably connecting the stator or the armature to the drive shaft;
   a trickle device capable of applying a synthetic resin onto at least one axial end of windings of the stator or the armature; and
   a heating device capable of heating the windings of the stator or the armature to a trickle temperature and to a comparatively higher curing temperature, the heating device including an electromagnetic inductor which is arranged coaxially or axially parallel to the stator or the armature.

2. The impregnation device according to claim 1, characterized in that the inductor is arranged coaxially or axially parallel to the stator or the armature only over a portion of the axial length of the same.

3. The impregnation device according to claim 1, characterized in that the inductor is arranged coaxially or axially parallel to the stator or the armature over the entire axial length of the same.

4. The impregnation device according to claim 1, wherein the inductor is arranged radially above the stator or the armature.

5. The impregnation device according to claim 1, wherein the inductor is arranged radially inside the stator.

6. The impregnation device according to claim 1, further including:
   a frame;
   a holding device which is arranged on the frame by a first pivot bearing so as to be tiltable about a horizontal pivot axis;
   a pivot actuator for pivoting the holding device on the first pivot bearing with respect to the frame;
   a drive motor attached to the holding device;
   a drive shaft operatively connected to the drive motor;
   a clamping device which is non-rotatably connected to the drive shaft and capable of detachably connecting the stator or the armature to the drive shaft, wherein at least one component of the clamping device engages radially inwardly on the stator or radially outwardly on the armature; and
   an electromagnetic inductor which is arranged coaxially or axially parallel to the stator or the armature and to the clamping device.

7. The impregnation device according to claim 6, wherein the clamping device comprises at least one clamping rod which axially penetrates the stator radially inside, and in that the clamping rod is connected directly or indirectly to the stator.

8. The impregnation device according to claim 7, wherein the clamping rod is connected at its axial end to at least two clamping jaws or at least two radially segmented clamping discs, in that these clamping jaws or clamping discs are arranged respectively abutting radially inwardly at an axial end of the frame of the stator, and in that the two clamping jaws or clamping discs can be clamped against the stator by the clamping rod so that the former is fixed to the clamping rod.

9. The impregnation device according to claim 1, wherein the inductor is electrically connected to a voltage source which operates as a frequency converter, and in that the voltage source is arranged on the tiltable holding device just as the inductor.

10. The impregnation device according to claim 1, wherein the inductor is connected to an actuating element of an actuator capable of arranging the inductor on the holding device so as to be movable coaxially or axially parallel to the longitudinal axis of the stator or the armature.

11. The impregnation device according to claim 1, wherein the inductor and its voltage source are connected to an actuating element of an actuator capable of arranging the inductor on the holding device so as to be movable coaxially or axially parallel to the longitudinal axis of the stator or the armature, and arranging the voltage source on the holding device so as to be movable parallel to the longitudinal axis of the stator or the armature.

12. The impregnation device according to claim 1, wherein a trickle device is provided which comprises a container for a synthetic resin, a container for a hardener, a mixing container, shut-off valves arranged in pipes between these containers, and a pump, wherein the pump is connected via a feed pipe to at least one trickle nozzle capable of trickling the synthetic resin onto the windings of the stator or the armature.

13. The impregnation device according to claim 1, wherein a temperature sensor is provided, which is capable of contactlessly measuring the outside temperature of the stator or the armature.

14. The impregnation device according to claim 1, wherein a control unit is provided which is connected via a sensor cable to the temperature sensor and via control cables to the drive motor, the actuator, the shut-off valves between the containers for the synthetic resin and the hardener and the mixing container, the pump for delivering the synthetic resin-hardener mixture, and the voltage source for the inductor.

15. A production plant for trickle impregnation of a stator or armature of an electric machine with a synthetic resin curing under temperature increase, comprising: an input module for storing non-impregnated stators or non-impregnated armatures; an impregnation module with an impregnation device comprising an electromagnetic inductor with the features of claim 1 for trickle impregnation of stators or the armatures; a cooling module for cooling down and storing impregnated stators or armatures; an output module for storing cooled and impregnated stators or armatures; and a first robot for transporting the respective stator or armature between the input module, the impregnation module, the cooling module and the output module, the first robot adapted to hold the respective stator or the armature, tilt it with respect to the horizontal, rotate it about its longitudinal axis, arrange it coaxially with a hollow cylindrical or coil-shaped inductor, and move it axially with respect to the stationary or axially movable inductor.

16. The production plant according to claim 15, wherein a curing module is provided, in which stators or armatures are arranged for complete curing, and in that the first robot is designed such that it can also fill and empty the curing module.

17. The production plant according to claim 16, wherein the curing module includes its own inductor capable of heating stators or armatures stored in the curing module for complete curing.

18. The production plant according to claim 16, wherein the curing module includes, for each stator or armature to be stored there, a separate rotary drive capable of rotating the respective stator or armature about its longitudinal axis during its curing.

19. The production plant according to claim 16, wherein a storage module is provided in which containers for synthetic resin and containers for hardener can be stored, and in that the storage module can be filled and emptied by the first robot or by a second robot.

* * * * *